Nov. 8, 1955  A. GROSS  2,723,162
WHEEL
Filed Jan. 30, 1953
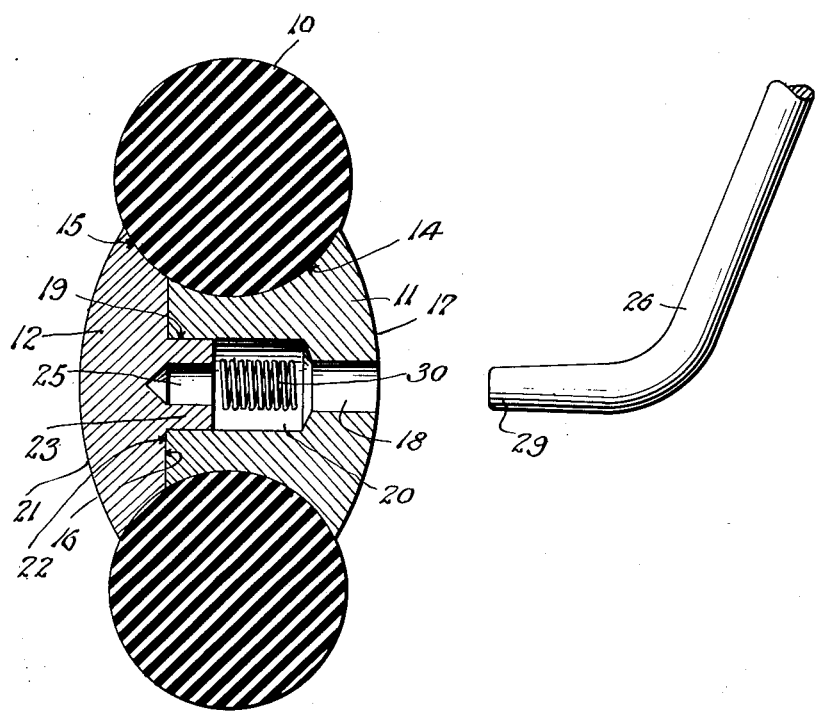
INVENTOR.
Albert Gross
BY
Henry H Snelling
ATTORNEY.

2,723,162
WHEEL

Albert Gross, Baltimore, Md., assignor to The Perfect Parts Co., Baltimore, Md., a corporation of Maryland Application January 30, 1953, Serial No. 334,253

2 Claims. (Cl. 301—111)

This invention relates to miniature wheels and the like and has for its principal object the provision of an easily applied device for self-locking a wheel firmly in any chosen position on an axle or shaft while offering minimum resistance to turning about the axis of revolution.

A further object of the invention is to provide a particularly attractive wheel for a miniature airplane, automobile, truck, racing car or the like, which can readily be applied to or removed from a landing gear axle and will closely resemble the wheel of a passenger-carrying plane in tire carrying arrangement, streamlining of the hub exterior, etc.

A particular object is to provide a simple, sturdy, inexpensive wheel of minimum number of parts, easy to apply to its axle and removable only intentionally, remaining on the axle during any ordinary use, including rough treatment.

The figure is a central vertical section.

In model airplanes, for example, the wheels must be quite sturdy, symmetrical, attractive in configuration, offering minimum friction in rotation, and while readily slidable into chosen position on the landing gear axles, without any tools, requiring a gentle pressure, can be removed only by a steady light axial pull, never by a jerk or such knocks as such a wheel might encounter in use. While this is the chosen field for the invention, and it will be so described, the wheel is obviously suited to cars, toys, and other uses requiring a rotating object.

In its preferred form for use on a model or miniature airplane the wheel consists of a tire 10 circular in cross section, a hub formed of an inner section 11 and an outer section 12. The curved surfaces 14 and 15 together form an annular channel to receive the tire 10. The transverse width of the surface 15 is smaller than that of the cooperating surface 14, preferable in the ratio of one to four or five. This permits easy sliding of the tire onto the larger portion of the channel carried by the inner hub section 11 with a subsequent locking of the tire by adding the outer hub section 12 carrying the narrow annular groove 15.

The larger section has a plane annular internal face 16 and a spherical external face 17 centrally perforated by an opening 18 coaxial with a larger bore 19 which forms a chamber 20. The smaller hub section 12 has a smooth, unbroken spherical face 21, a plane face 22 of the same size as the face 16, and a cylindrical boss 23 to fit the bore 19 so that the two sections may be secured together in a semi-permanent manner as by threading or better by a force fit. While not essential, it is preferred the boss be counterbored as at 25 so that a landing gear axle such as 26 may be inserted in the coaxial openings 18 and 25 with just enough clearance to provide free rotation of the wheel. A helically wound coil spring 30, positioned in the chamber 20, has an internal diameter slightly less than the diameter of the axle at the point where the axle will be inside the chamber, and an overall diameter when mounted on the axle of less than the diameter of the chamber 20 by an amount that will permit of rotation of the wheel on the axle without touching the periphery of the spring. It is preferred that the over-all axial length of the outer hub section 12 shall be somewhat less than half the axial length of the hub and that the chamber shall be approximately centrally of the hub laterally but a bit nearer the face 17 and have a diameter equal to the inner radius of the tire or what is the same thing, the smallest radius of the channel 14—15.

In assembling the device the tire 10 is expanded to slip into the groove 14 which it grips firmly, the spring 30 is dropped into the chamber 20 and the outer hub section is then secured in place as by a force fit of its boss 23 in the bore 19 closing the chamber 20 and locking the tire in place. Next the assembled wheel is gently pushed on the axle 26 which may have a slightly tapered end 29. The axle, with or without such a taper slips into the central opening in the coil 30, expanding the spring and passes into the bore 25 in the boss. This bore is optional and may extend entirely thru the outer hub section altho it is much preferred that the face 21 be smooth and unbroken, the more to resemble the full sized counterpart. The hub and tire are now free to rotate on the axle but since the coiled spring 30 is of approximately the same length as the chamber 20, the wheel has little or no axial movement on the shaft 26. While the wheel may be removed from the shaft on which it rotates by a steady pull, it will not come loose in normal operation as the friction between the spring and axle is well sufficient to prevent this. If desired the two ends of the spring may be turned in to minimize the rather negligent friction against the smooth face of the boss on the bottom of the bore 19 where it joins the opening 18. The wheel may readily be oiled if desired as the spring is of metal and the hub sections are of metal or plastic or other material not affected by oil.

I claim:

1. A wheel comprising an inner hub section having a central cylindrical chamber and an axle receiving opening of smaller diameter opening into the chamber coaxially thereof, an outer hub section having a central boss fitting the chamber to hold the sections together, said hub sections having cooperating portions of a peripheral groove to receive a torus-shaped tire and a helically wound coil spring loosely positioned in the chamber, having an inside diameter smaller than said opening.

2. The wheel of claim 1 in which the boss has a force fit with the chamber and the axial length of the spring is approximately the length of the chamber when the boss is in place.

References Cited in the file of this patent

UNITED STATES PATENTS

| 719,831 | Melvin | Feb. 3, 1903 |
| 1,036,813 | Edsall et al. | Aug. 27, 1912 |
| 1,803,019 | Holm | Apr. 28, 1931 |
| 2,496,615 | Ayers | Feb. 7, 1950 |
| 2,592,164 | Maxam | Apr. 8, 1952 |

FOREIGN PATENTS

| 28,883 | Austria | Nov. 24, 1905 |